United States Patent
Inoue (10) Patent No.: US 8,962,109 B2
(45) Date of Patent: Feb. 24, 2015

(54) LIQUID CRYSTAL DISPLAY

(75) Inventor: Rikio Inoue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 226 days.

(21) Appl. No.: 13/592,056

(22) Filed: Aug. 22, 2012

(65) Prior Publication Data

US 2013/0050614 A1 Feb. 28, 2013

(30) Foreign Application Priority Data

Aug. 23, 2011 (JP) .................................. 2011-181309
Apr. 11, 2012 (JP) .................................. 2012-090032

(51) Int. Cl.
G02F 1/13363 (2006.01)
G02F 1/1335 (2006.01)
G02B 5/30 (2006.01)

(52) U.S. Cl.
CPC .......... *G02F 1/13363* (2013.01); *G02B 5/3025* (2013.01); *G02B 5/3083* (2013.01); *G02F 1/133528* (2013.01); *G02F 1/133615* (2013.01); *G02F 2001/133531* (2013.01); *G02F 2001/133635* (2013.01); *G02F 2201/50* (2013.01); *G02F 2201/54* (2013.01); *G02F 2413/02* (2013.01); *G02F 2413/05* (2013.01); *G02F 2413/08* (2013.01)
USPC .............................. 428/1.33; 349/96; 349/122

(58) Field of Classification Search
CPC ................ G02B 5/3025; G02B 5/3083; G02F 1/133528; G02F 1/133615; G02F 1/13363; G02F 2001/133531; G02F 2001/133635; G02F 2201/50; G02F 2201/54; G02F 2413/02; G02F 2413/05; G02F 2413/08

USPC ................. 349/96, 98, 117–118; 359/483.01, 359/489.07
See application file for complete search history.

(56) References Cited

U.S. PATENT DOCUMENTS

| | | | | |
|---|---|---|---|---|
| 2002/0015807 | A1* | 2/2002 | Sugino et al. | 428/1.31 |
| 2005/0117217 | A1* | 6/2005 | Yamaoka et al. | 359/483 |
| 2008/0254236 | A1* | 10/2008 | Kawanishi et al. | 428/1.1 |
| 2010/0032866 | A1* | 2/2010 | Nakai et al. | 264/291 |
| 2012/0204758 | A1* | 8/2012 | Takada et al. | 106/170.31 |

FOREIGN PATENT DOCUMENTS

| | | | |
|---|---|---|---|
| JP | 200325473 A | 1/2003 | |
| JP | 2003025473 A * | 1/2003 | ............... B32B 7/02 |
| JP | 2010217844 A * | 9/2010 | |

* cited by examiner

*Primary Examiner* — Sophie Hon
(74) *Attorney, Agent, or Firm* — Jean C. Edwards, Esq.; Edwards Neils PLLC (57) ABSTRACT

A liquid crystal display includes a liquid crystal cell; a back light including a light source; and a laminated polarizing plate including a protective film, a polarizing film, and a retardation film in sequence from the side of the back light, wherein the angle defined by any one of the long and short sides of the polarizing plate and the absorption axis of the polarization film is 45°, the retardation film has an in-plane slow axis parallel or orthogonal to the absorption axis of the polarizing film, and the liquid crystal display satisfies the formula: $M=|\delta TD/\delta MD| \geq 2.0$, where M represents the ratio of the dimensional change rates in the entire polarizing plate, $\delta MD$ (%) represents a percent change of the polarizing plate in the absorption axis direction, and $\delta TD$ (%) represents a percent change of the polarizing plate in the direction orthogonal to the absorption axis.

20 Claims, 2 Drawing Sheets

LIQUID CRYSTAL DISPLAY

CROSS-REFERENCE TO RELATED APPLICATIONS

The present application claims the benefit of priority from Japanese Patent Application No. 181309/2011, filed on Aug. 23, 2011, and Japanese Patent Application No. 090032/2012 filed on Apr. 11, 2012, the contents of which are herein incorporated by reference in their entirety.

BACKGROUND OF THE INVENTION

1. Field of the Invention

The present invention relates to an improvement in display characteristics of liquid crystal displays, and in particular, to liquid crystal displays suitable for use in apparatuses for personal use, such as laptop computers.

2. Description of the Related Art

In recent years, liquid crystal displays have been increasingly applied to television sets, which leads to high demands for larger and thinner liquid crystal display panels. This has also induced many proposals for apparatuses provided with larger and thinner liquid crystal display panels or components used therefor.

For example, JP-A2010-217844 discloses a liquid crystal display including the following components disposed in sequence: a first polarizing plate which includes a first polarizing film composed of polyvinyl alcohol resin and an acrylic resin film; a liquid crystal panel; and a second polarizing plate which includes a second polarizing film composed of polyvinyl alcohol resin and a stretched polyethylene terephthalate film. JP-A2005-49698 also discloses a polarizing plate including a polarizer composed of an iodine-containing polyvinyl alcohol film having a thickness of 8 to 18 μm and is cured with boric acid, the polarizing plate exhibiting a transmittance of 0.001 to 0.1% to a wavelength of 410 nm under crossed nicols. JP-A2003-25473 further discloses an optical component which includes an optical film having a thickness of 150 μm or lower and an adhesive protective film having a thickness of 40 μm or higher.

Liquid crystal displays are also used in laptop computers (hereinafter referred to as laptops). Unlike television sets, laptops are not viewed by multiple viewers, which eliminates a need for an increase in size of laptops. In addition, the distance between a liquid crystal display and a user is short as compared to television sets.

Even though characteristics required for displays of large-screen television sets are different from those required for displays of laptops as described above, various studies have been continuously conducted for a reduction in thickness, without regard to such a difference.

SUMMARY OF THE INVENTION

Since displays used in apparatuses for personal use, such as laptops, are not viewed by multiple viewers, essential requirements for such displays are a reduction in thickness and electric power saving, rather than an increase in size. Use of a back light including a light source disposed at an edge or a corner in the rear of a liquid crystal cell is advantageous to a reduction in size of displays. However, heat emitted from the light source disposed at the edge or corner in the rear of the liquid crystal cell generates an in-plane temperature gradient; a back-light-side polarizing plate has a high-temperature portion in the vicinity of the light source whereas a low-temperature portion distant from the light source. This leads to partial contraction, expansion and thermal unevenness of a protective film, a polarizing film, and a retardation film each included in the back-light-side polarizing plate.

It is an object of the present invention, which has been accomplished to solve the problems described above, to provide a liquid crystal display free from the occurrence of thermal unevenness and suitable for use in apparatuses for personal use, such as laptops.

The problems described in the above were successfully solved by the solution described in below.

(1) A liquid crystal display comprising:
a liquid crystal cell;
a back light including a light source disposed at any one of an edge and a corner in the rear of the liquid crystal cell; and
a laminated polarizing plate including a protective film, a polarizing film, and a retardation film in sequence from the side of the back light, wherein
the angle defined by any one of the long and short sides of the polarizing plate and the absorption axis of the polarization film is 45°,
the retardation film has an in-plane slow axis parallel or orthogonal to the absorption axis of the polarizing film,
the protective film has a thickness of 10 to 60 μm and a tensile modulus of 3.0 to 8.0 GPa,
the polarizing film has a thickness being 10 to 50% of the thickness of the protective film,
the retardation film comprises a cyclic olefin resin and has a thickness being 30 to 100% of the thickness of the protective film, and
a dimensional change rate δMD of the polarizing plate in the absorption axis direction of the polarizing film and a dimensional change rate δTD of the polarizing plate in a direction orthogonal to the absorption axis of the polarizing film satisfy the formula:

$$M=|\delta TD/\delta MD|\geq 2.0,$$

where M represents the ratio of the dimensional change rates in the entire polarizing plate, δMD (%) represents a percent change in the length of the polarizing plate after being dried at 60° C. for 100 hours to the initial length of the polarizing plate in the absorption axis direction at 25° C. and a 60% RH, and δTD (%) represents a percent change in the length of the polarizing plate after being dried at 60° C. for 100 hours to the initial length of the polarizing plate in the direction orthogonal to the absorption axis at 25° C. and 60% RH.

(2) The liquid crystal display according to (1), wherein the retardation film is an optically biaxial retardation film.

(3) The liquid crystal display according to (1) or (2), wherein the product of a thickness (unit: μm) and a tensile modulus (unit: GPa) of the protective film is not less than 140.

(4) The liquid crystal display according to anyone of (1) to (3), further comprising:
a viewing-side polarizing film provided at the viewing side of the liquid crystal cell, wherein the retardation film is provided between the liquid crystal cell and the viewing-side polarizing film; and the protective film is provided on the viewing-side surface of the viewing-side polarizing film.

(5) The liquid crystal display according to anyone of (1) to (4), further comprising:
any one of a brightness-enhancing film and a prism sheet provided at the back light side of the protective film.

(6) The liquid crystal display according to anyone of (1) to (5), wherein the liquid crystal cell is a TN-mode liquid crystal cell.

(7) The liquid crystal display according to anyone of (1) to (6), wherein the liquid crystal cell has a size ranging from 3 to 24 inches.

(8) The liquid crystal display according to anyone of (1) to (7), wherein the liquid crystal display is a display of a laptop.

An aspect of the present invention provides a liquid crystal display free from the occurrence of thermal unevenness and suitable for use in apparatuses for personal use, such as laptops.

BEST MODE FOR CARRYING OUT THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (B):

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$(B): Rth = \{(nx+ny)/2 - nz\} \times d$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

In this specification, the terms "parallel" and "orthogonal" mean that the designated angle falls within the range of less than ±10° from a strict angle. This range is preferably less than ±5°, and more preferably less than ±2° in terms of an error from the strict angle. Also, the "slow axis" means a direction at which the refractive index is maximum.

In this specification, the terms "machine direction" (MD direction) represents a direction in which the polarizing film is stretched, namely, absorption axis direction, and transverse direction (TD direction) represents the orthogonal direction to the MD direction.

The present invention relates to a liquid crystal display including a liquid crystal cell, a back light including a light source disposed at an edge or a corner in the rear of the liquid crystal cell, and a laminated polarizing plate including a protective film, a polarizing film, and a retardation film in sequence from the side of the back light, wherein the angle defined by any one of the long and short sides of the polarizing plate and the absorption axis of the polarization film is 45°, the retardation film has an in-plane slow axis parallel or orthogonal to the absorption axis of the polarizing film, the protective film has a thickness of 10 to 60 μm and a tensile modulus of 3.0 to 8.0 GPa, the polarizing film has a thickness being 10 to 50% of the thickness of the protective film, the retardation film is primarily composed of a cyclic olefin resin and has a thickness being 30 to 100% of the thickness of the protective film, and a dimensional change rate δMD of the polarizing plate in the absorption axis direction of the polarizing film and a dimensional change rate δTD of the polarizing plate in a direction orthogonal to the absorption axis of the polarizing film satisfy the formula:

$$M=|\delta TD/\delta MD|\geq 2.0,$$

where M represents the ratio of the dimensional change rates in the entire polarizing plate, δMD (%) represents a percent change in the length of the polarizing plate after being dried at 60° C. for 100 hours to the initial length of the polarizing plate in the absorption axis direction at 25° C. and a 60% relative humidity (RH), and δTD (%) represents a percent change in the length of the polarizing plate after being dried at 60° C. for 100 hours to the initial length of the polarizing plate in the direction orthogonal to the absorption axis at 25° C. and 60% RH.

In the present invention, the back light includes the light source disposed at an edge or a corner in the rear of the liquid crystal cell, which provides an advantage of a reduction in size of the liquid crystal display. The liquid crystal display is suitably applied to apparatuses for personal use, especially suitable for application to laptops. Although the back light including the light source disposed at an edge or a corner in the rear of the liquid crystal cell provides an advantage of a reduction in size of the liquid crystal display, use of such a back light causes an in-plane temperature gradient by heat emitted from the light source disposed at a side edge of the liquid crystal display; a back-light-side polarizing plate has a high-temperature portion in the vicinity of the light source whereas a low-temperature portion distant from the light source. Heat applied to a polarizing plate causes anisotropic contraction of a polarizing film of the polarizing plate (in general, stretched polyvinyl alcohol film dyed with iodine), and contractive force in the polarizing film generates in-plane stress in the retardation film. In particular, a retardation film composed of cyclic olefin resins thermally expands and therefore has an inverse behavior to the thermal contraction of the polarizing film, resulting in increases in distortion and stress of the retardation film.

However, according to comparison of VA-mode liquid crystal with TN-mode liquid crystal in a small polarizing plate, thermal unevenness does not substantially occur in the VA-mode liquid crystal while occurring in the TN-mode liquid crystal. This result is caused for the following reason.

Figure 2:
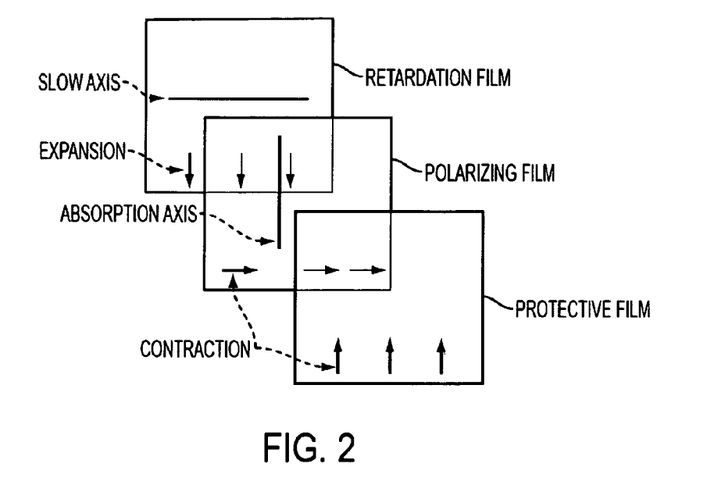
FIG. 2 is a schematic illustration of contraction and expansion of a protective film, a polarizing film, and a retardation film in a vertical alignment (VA) mode.

In a VA-mode liquid crystal cell illustrated in FIG. 2 with a light source disposed at the lower edge in the drawing, a polarizing film exhibits the largest contraction in the direction orthogonal to an absorption axis due to moisture release. A retardation film and a protective film expand or contract in the direction of the light source, and the expansion and the contraction are not uniform affected by their in-plane temperature distributions.

In this case, the direction of the contraction of the polarizing film is substantially orthogonal to the direction of the expansion or contraction of the retardation film and the protective film, and the angle of an in-plane slow axis of the retardation film is not affected by the stress which acts on the retardation film incorporated into a polarizing plate at its portion near the light source and is orthogonal or parallel to the in-plane slow axis, so that thermal unevenness is less likely to occur.

Furthermore, a small polarizing plate (liquid crystal panel) exhibits a small dimensional change (absolute value of difference); hence, a retardation film receives small stress from an adhesive agent, which is one of the reasons why thermal unevenness is less likely to occur.

Figure 3:
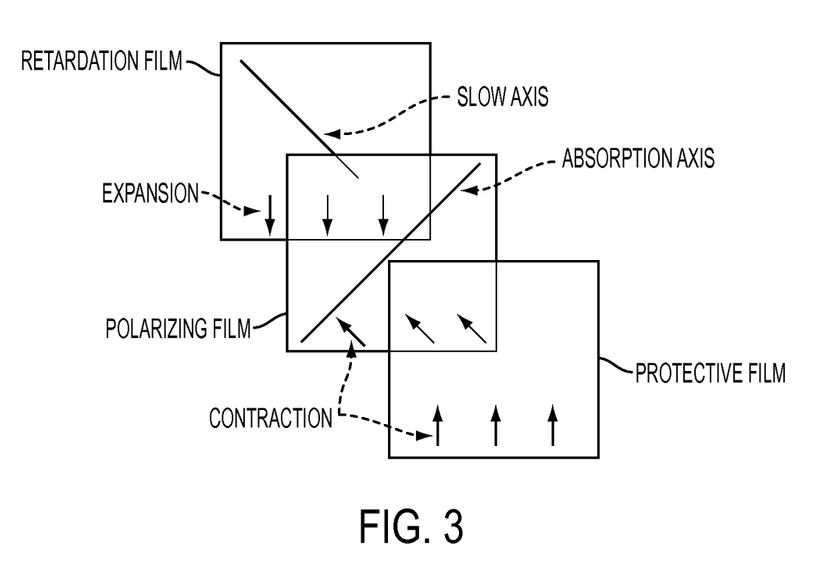
FIG. 3 is a schematic illustration of contraction and expansion of a protective film, a polarizing film, and a retardation film in a twisted nematic (TN) mode.

With reference to FIG. 3, in a TN-mode liquid crystal cell with a light source disposed at the lower edge in the drawing, a polarizing film also exhibits the largest contraction in the direction orthogonal to an absorption axis due to moisture release, a retardation film and a protective film expand or contract in the direction of the light source, and the expansion or the contraction are not uniform affected by their in-plane temperature distributions.

In this case, the direction of the contraction of the polarizing film intersects the direction of the expansion or contraction of the retardation film and the protective film approximately at 45°, and the angle of an in-plane slow axis of the retardation film is affected by stress which acts on the retardation film incorporated into a polarizing plate at its portion near the light source and is not orthogonal or parallel to the in-plane slow axis, resulting in the easy occurrence of thermal unevenness.

One of the possible measures to overcome the issue of stress generated in TN-mode liquid crystal cells is elimination of thermal contraction of a polarizing film; however, the measure is technically difficult.

The inventor has conducted extensive studies to note that thermal contraction of a polarizing film has anisotropy and found that a reduction in contraction of a polarizing plate only in a direction in which the polarizing plate originally exhibits small thermal contraction (stretching direction of the polarizing film, namely, absorption axis direction) causes stress substantially orthogonal or parallel to an in-plane slow axis of a retardation film to act on the retardation film incorporated into the polarizing plate at its portion near a light source with a result that thermal unevenness is less likely to occur because an angle of the in-plane slow axis of the retardation film is substantially not affected by the action of the stress.

In the present invention, the absorption axis direction of a polarizing plate is distinguished from the direction orthogonal to the absorption axis direction, and only the contraction in the direction parallel to the absorption axis direction of anisotropic thermal contraction of the polarizing plate exposed to high-temperature environments is reduced, which enables stress to act on a retardation film incorporated into the polarizing plate in a direction substantially orthogonal to the absorption axis and enables thermal unevenness to be effectively reduced because the angle of an in-plane slow axis of the retardation film is substantially not affected by the stress.

In the present invention, a retardation film composed of cyclic olefin resin is disposed between a polarizing film and liquid crystal cell to form a back-light-side polarizing plate, a film having a thickness and a tensile modulus within predetermined ranges is used as a protective film disposed on the back light side of the polarizing film, the thicknesses of the retardation film and the back-light-side polarizing film are adjusted within predetermined ranges depending on the thickness of the protective film provided to the polarizing film, and the dimensional change rates of the polarizing plate in a machine direction (MD) and a transverse direction (TD) are adjusted to satisfy a predetermined relationship, thereby reducing the contraction and expansion of the retardation film, the back-light-side polarizing film, and the protective film due to heat from a light source disposed at an edge or a corner of the liquid crystal display. Thermal unevenness due to use of a light source including a back light disposed at an edge or a corner of the liquid crystal display can be therefore reduced, and display unevenness (especially, display unevenness at black display portions) can be accordingly reduced. In the present invention, use of a light source including a back light disposed at an edge or a corner of the liquid crystal display can reduce the weight and thickness of the liquid crystal display, and inexpensive polymer films, such as biaxially-stretched films, can be used as retardation films. Thus, the liquid crystal display of the present invention is suitable for application to apparatuses for personal use, such as laptops, which need to be sold at low prices.

Figure 1:
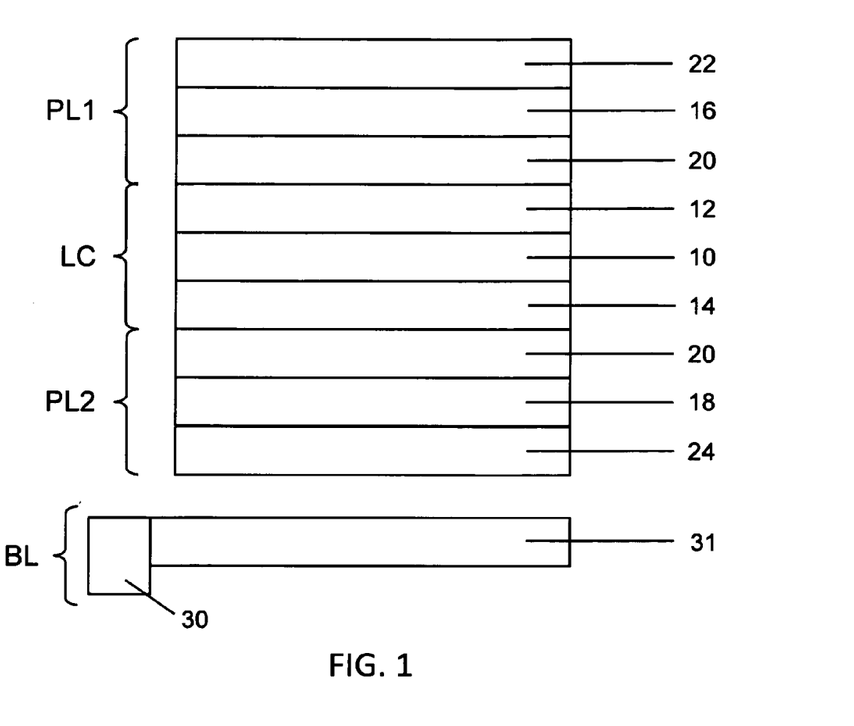
FIG. 1 is a cross-sectional view schematically illustrating a liquid crystal display of an embodiment of the present invention.

FIG. 1 is a schematic cross-sectional view of a liquid crystal display of an embodiment of the present invention. In the drawing, the relative thicknesses of individual layers do not always reflect the relative thicknesses of individual layers of an actual liquid crystal display.

The liquid crystal display illustrated in FIG. 1 includes a back light BL including a light source disposed at an edge of the liquid crystal display and a laminate of a protective film 24, a polarizing film 18, a retardation film 20, and a liquid crystal cell LC in sequence from the back light side. The liquid crystal display includes a viewing-side polarizing film 16 provided at the viewing side (front side) of the liquid crystal cell LC, and the viewing-side polarizing film 16 may be integrated with another retardation film 20 and a protective film 22 into a polarizing plate PL1. The retardation film 20, the polarizing film 18, and the protective film 24 define a back-light-side polarizing plate PL2.

The liquid crystal cell LC includes a pair of substrates 12 and 14 and a liquid crystal layer 10 disposed therebetween and composed of a nematic liquid crystal material. Rubbed alignment films (not illustrated) are disposed between the substrates 12 and 14, so that the rubbed alignment films align the nematic liquid crystal in the rubbing direction thereof into a twisted alignment. The substrates 12 and 14 have inner surfaces provided with electrode layers (not illustrated), and application of a voltage causes the twisted alignment of the nematic liquid crystal to be released to an alignment vertical to the surfaces of the substrates. The liquid crystal cell LC may further include any other component such as a color filter. In the present invention, the liquid crystal cell LC is preferably a TN-mode liquid crystal cell.

Since the liquid crystal display of the present invention is suitable for use in apparatuses for personal use, its liquid crystal cell has a size preferably ranging from 3 to 24 inches, more preferably from 5 to 20 inches, and further preferably from 7 to 17 inches. The term "inch" representing the size of a liquid crystal cell herein refers to a diagonal dimension of the liquid crystal cell. The height and width of the screen of the liquid crystal cell vary depending on the number of dots.

In the case of a TN-mode liquid crystal cell LC, the polarizing films 16 and 18 are disposed so as to have transmission axes orthogonal to each other, the transmission axes tilting by 45° and 135°, respectively, from the horizontal direction (also referred to as 0° direction) of the display surface. In an embodiment, the transmission axis of the polarizing film 16 is parallel to the rubbing axis of the substrate 12 while the transmission axis of the polarizing film 18 is parallel to the rubbing axis of the substrate 14.

The polarizing film 18 has a thickness of preferably 10 to 50%, more preferably 20 to 50%, and further preferably 25 to 50% of that of the protective film 24.

The polarizing film 18 having a thickness less than 10% of that of the protective film 24 cannot prevent an angle variation of a slow axis of a retardation film, whereas the polarizing film 18 having a thickness greater than 50% of that of the protective film 24 cannot reduce contraction of a polarizing film, in some cases The retardation film 20 is disposed between the polarizing film 18 and the liquid crystal cell LC, is primarily composed of a cyclic olefin resins, and optically compensates for the liquid crystal cell LC for a reduction in black brightness in the lateral direction on the screen to improve view angle characteristics in the lateral direction. For such a function, an in-plane slow axis of the retardation film 20 is preferably parallel or orthogonal to and more preferably parallel to the direction of rubbing carried out to the inner surfaces of the substrates 12 and 14.

The retardation film 20 has a thickness of preferably 30 to 100%, more preferably 50 to 100%, and further preferably 50 to 80% of that of the protective film 24.

The retardation film 20 having a thickness less than 30% of that of the protective film 24 cannot adjust the optical characteristics of the retardation film within a predetermined range, whereas the retardation film 20 having a thickness greater than 100% of that of the protective film cannot reduce the angle variation of the slow axis of the retardation film, in some cases.

The phase difference of the retardation film 20 is preferably Re(550)=1 to 80 nm and Rth(550)=100 to 180 nm, and more preferably Re(550)=5 to 60 nm and Rth(550)=110 to 160 nm.

The retardation film 20 preferably is composed of cyclic olefin resin as a main component because the resin exhibits small changes in physical properties caused by environmental moisture. An optically biaxial film primarily composed of cyclic olefin resin is more preferred because of excellent compensation of a view angle of a TN-mode liquid crystal cell. Further preferred is a negative biaxial film having a smaller refractive index in the thickness direction than an in-plane refractive index.

The term "optically biaxial" herein represents that the birefringent crystal n has two optical axes in a direction in which the refractive index is constant in the optically anisotropic birefringent crystal and the entrance of non-polarized light to the optically anisotropic birefringent crystal does not cause birefringence and shows alignment of ordinary rays with extraordinary rays (or shows minimum misalignment therebetween).

In particular, the birefringent crystal exhibits optically biaxial properties except a case where in-plane phase difference Re (described later) is not 0 or the in-plane phase difference Re and phase difference Rth in the thickness direction have the relationship of Re=2Rth.

The retardation film 20 is also preferably disposed between the polarizing film 16 and the liquid crystal cell LC. The details of the retardation film 20 will be described below.

The protective film 24 is disposed on the back surface (back light side) of the polarizing film 18, and the protective film 22 is disposed on the viewing-side surface of the polarizing film 16.

Various polymer films can be used for the protective film 24 without limitation. The protective film 24 may be a film primarily composed of cyclic olefin resin as in the retardation film 20 or may be a cellulose acylate film or an acrylic polymer film widely used as a protective film of a polarizing plate.

The protective film 24 has a thickness of 10 to 60 μm, preferably 20 to 45 μm, and more preferably 25 to 40 μm.

A thickness less than 10 μm cannot reduce the contraction of a polarizing film, whereas a thickness greater than 60 μm cannot reduce the angle variation of the slow axis of a retardation film, in some cases.

The protective film 24 has a tensile modulus of 3.0 to 8.0 GPa, preferably 4.0 to 8.0 GPa, and more preferably 5.0 to 7.0 GPa.

A tensile modulus less than 3.0 GPa cannot reduce the contraction of a polarizing film in some cases, whereas a tensile modulus greater than 8.0 GPa precludes formation of a practical polymer film.

In particular, in the case where a thickness (unit: μm) and tensile modulus (unit: GPa) of a protective film are within the above preferred ranges, the product of these values is preferably not less than 140, more preferably not less than 170, and most preferably not less than 200.

The protective film 22 may be a polymer film as in the protective film 24 or may be a multilayered film at least including a hardcoat layer and a low-refractive-index layer formed thereon. The protective film 22 may be composed of the same polymer film as or a different polymer film from that used for the protective film 24. The details of the protective films 22 and 24 will be described later.

In the present invention, assuming that the dimensional change rate of a polarizing plate in the absorption axis direction of the polarizing film 18 is $\delta MD$ and that the dimensional change rate of the polarizing plate in the direction orthogonal to the absorption axis is $\delta TD$, the formula $M=|\delta TD/\delta MD| \geq 2.0$ is satisfied. M is preferably 2.5 or higher, and more preferably 3.5 or higher.

At M of less than 2.0, the stress generated in a retardation film cannot be directed in the direction orthogonal to the absorption axis, and the angle of the slow axis varies. As a result, thermal unevenness cannot be effectively reduced in some cases.

In the formula, M represents the ratio of the dimensional change rates in the entire polarizing plate, in other words, the anisotropy of the dimensional change rates; $\delta MD$ (%) represents a percent change in the length of the polarizing plate after being dried at 60° C. for 100 hours to the initial length of the polarizing plate in the absorption axis direction at 25° C. and 60% RH; and $\delta TD$ (%) represents a percent change in the length of the polarizing plate after being dried at 60° C. for 100 hours to the initial length of the polarizing plate in the direction orthogonal to the absorption axis at 25° C. and 60% RH. The dimensional change rate of the polarizing plate will be described in detail later.

The back light BL has a light source disposed at a side edge of the liquid crystal display and at least includes a light source 30 and a light guide panel 31 which diverts light emitted from the light source 30 to a planar light beam to enter the liquid crystal cell CL for adjustment of the directivity of the light, the light source 30 being disposed at a side edge (outer edge) of the light guide panel 31.

In the present invention, the light source may be a cold cathode fluorescent lamp (CCFL) linearly disposed at an edge of the liquid crystal display or may consist of several light-emitting diodes (LEDs) disposed at the edge thereof. LEDs disposed only at the four corners between the edges can provide the same advantageous effect.

The light source and other components used in the back light BL are not specifically limited. In addition to the light guide panel 31, the back light BL may include components which can adjust the directivity of light, such as a prism sheet and a diffusion film, and such components are disposed so as to face the back light side of the protective film 24, in other words, disposed between the protective film 24 and the light guide panel 31.

Components used in the present invention will now be described.

1. Retardation Film

In the present invention, a retardation film primarily composed of cyclic olefin resin is disposed between the back-light-side polarizing film and the liquid crystal cell or between the viewing-side polarizing film and the liquid crystal cell.

The term "primarily composed of" herein refers to one cyclic olefin component in the case where a single cyclic olefin is used as a material of the film or a cyclic olefin of the highest content in the case where two or more cyclic olefins are used.

Cyclic olefin resins are preferably saturated norbornene resins having a cyclic olefin structure. Although the saturated norbornene resins can be applied to both a solvent casting method and a melt casting method, saturated norbornene resin-A is preferably used in a melt casting method, whereas saturated norbornene resin-B is preferably used in a solvent casting method.

Saturated Norbornene Resin-A

Examples of saturated norbornene resins having a cyclic olefin structure and used in the present invention include (1) resins synthesized by hydrogenating ring-opened polymers (including copolymers) of norbornene monomers optionally subjected to polymer modification, such as addition of maleic acid or addition of cyclopentadiene, (2) resins synthesized by addition polymerization of norbornene monomers, and (3) resins synthesized by addition copolymerization of norbornene monomers with olefin monomers, such as ethylene or α-olefin. Polymerization and hydrogenation can be carried out by traditional methods.

Examples of the norbornene monomers include norbornene and alkyl and/or alkylidene substituent thereof, for example, 5-methyl-2-norbornene, 5-dimethyl-2-norbornene, 5-ethyl-2-norbornene, 5-butyl-2-norbornene, 5-ethylidene-2-norbornene and the like, and polar substituents of halogens thereof; dicyclopentadiene, 2,3-dihydrodicyclopentadiene, and the like; dimethanooctahydronaphthalene, alkyl and/or alkylidene substituent thereof, and polar substituents such as halogens thereof, for example, 6-methyl-1,4-:5,8-dimethano-1,4,4a,5,6,7,8,8a-octahydronaphthalene, 6-ethyl-1,4-:5,8-dimethano-1,4,4a,5,6,7,8,8a-octahydronaphthalene, 6-ethylidene-1,4-:5,8-dimethano-1,4,4a,5,6,7,8,8a-octahydronaphthalene, 6-chloro-1,4-:5,8-dimethano-1,4,4a,5,6,7,8,8a-octahydronaphthalene, 6-cyano-1,4-:5,8-dimethano-1,4,4a,5,6,7,8,8a-octahydronaphthalene, 6-pyridyl-1,4-:5,8-dimethano-1,4,4a,5,6,7,8,8a-octahydronaphthalene, 6-methoxycarbonyl-1,4-:5,8-dimethano-1,4,4a,5,6,7,8,8a-octahydronaphthalene, and the like; adducts of cyclopentadiene and tetrahydroindene, and the like; di- to tetramer-cyclopentadiene, and the like, 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11,11a-dodecahydro-1H-cyclopentaanthracene; and the like.

(Saturated Norbornene Resin—B)

As for the saturated norbornene resin, the resins represented by the following formulae (1) to (4) may be used. Among these, the resin represented by the following formula (1) is most preferable.

formula (1)

formula (2)

formula (3)

formula (4)

In the formulae (1) to (4), each A, B, C, and D indicates a hydrogen atom or a monovalent organic group, and at least one thereof is a polar group.

A weight average molecular weight of the saturated norbornene resin is preferably in the range of 5,000 to 1,000,000, more preferably in the range of 8,000 to 200,000. In addition, a number average molecular weight of the resin is preferably in the range of 2,000 to 500,000, more preferably in the range of 4,000 to 100,000.

The saturated norbornene resins of the invention may be exemplified by the resins described in JP-A Nos. S60-168708, S62-252406, S62-252407, H2-133413, S63-145324, S63-264626, H1-240517, and S57-8815.

Among these resins, a hydrogenated polymer which can be obtained by adding hydrogen to a ring-opened polymer of the norbornene monomers is particularly preferable.

The glass transition temperature (Tg) of these saturated norbornene resins is preferably 120° C. or above, and more preferably 140° C. or above. In addition, the saturation water absorption of the saturated norbornene resin is preferably 1% by weight or less, and more preferably 0.8% by weight. The glass transition temperature (Tg) and the saturation water absorption of the saturated norbornene resins represented by the above formulae (1) to (4) can be controlled by selecting the kinds of substituents A, B, C, and D.

As the saturated norbornene resin useful in the invention, a tetracyclododecene derivative of at least one kind represented by the following formula (5) alone, or a hydrogenated polymer obtained by a metathesis polymerization of the tetracyclododecene derivative with an unsaturated cyclic compound copolymerizable with the derivative, may be used.

formula (5)

In the formula, each A, B, C, and D indicates a hydrogen atom or a monovalent organic group, and at least one thereof is a polar group.

When at least one substituent of A, B, C, and D is a polar group in the tetracyclododecene derivative represented by the above formula (5), a polarizing film having excellent adhesivity with other materials, heat resistance, and the like, can be obtained. Further, the polar group is preferably a group represented by —$(CH_2)_n$COOR (wherein, R is a hydrocarbon group having 1 to 20 carbon atoms, and n is an integer of 0 to 10) as it gives a final hydrogenated polymer (substrate of polarizing film) having a high glass transition temperature. In particular, the polar substituent represented by —$(CH_2)_n$COOR is preferably included by 1 per one molecule of the tetracyclododecene derivative of formula (5) from the viewpoint of lowering the water absorption. In the polar substituent, a greater number of carbon atoms in the hydrocarbon group represented by R is preferable from the viewpoint of lowering a moisture-absorbing property of the hydrogenated polymer to be obtained, but the hydrocarbon group is preferably a chained alkyl group having 1 to 4 carbon atoms or a (poly) cyclic alkyl group having 5 or more carbon atoms, and particularly preferably a methyl group, an ethyl group, or a cyclohexyl group, considering the point of balance with a glass transition temperature of the hydrogenated polymer to be obtained.

In addition, the tetracyclododecene derivative of formula (5), in which a hydrocarbon group having 1 to 10 carbon atoms is bonded as a substituent to a carbon atom to which the group represented by —$(CH_2)_n$COOR is bonded, is preferable since the hydrogenated polymer to be obtained becomes the polymer having a low moisture-absorbing property. In particular, the tetracyclododecene derivative of formula (5) in which the substituent is either a methyl group or an ethyl group is preferable from the point of its easy synthesis. In specific, 8-methyl-8-methoxycarbonyltetracyclo[4,4,0,12.5,17.10]-dodec-3-ene is preferred. These tetracyclododecene derivatives with the mixture of unsaturated cyclic compound copolymerizable with the derivatives can be subjected to a metathesis polymerization and a hydrogenation, in accordance with the method disclosed in, for example, JP-A No. H4-77520, line 12 on an upper right column of page 4 to line 6 on a bottom right column of page 6.

For these norbornene resins, the intrinsic viscosity measured in chloroform at 30° C. (ηinh) is preferably from 0.1 to 1.5 dl/g, and more preferably from 0.4 to 1.2 dl/g. For the hydrogenation rate of the hydrogenated polymer, the value measured with 60 MHz, $^1$H-NMR is 50% or more, preferably 90% or more, and more preferably 98% or more. As higher the hydrogenation rate, a saturated norbornene film to be obtained tends to have an excellent stability against heat and light. The content of gel to be included in the hydrogenated polymer is preferably 5% by weight or less, and more preferably 1% by weight or less.

The saturated norbornene resin of the invention may be stabilized by adding thereto the known antioxidants such as 2,6-di-tert-butyl-4-methylphenol, 2,2'-dioxy-3,3'-di-tert-butyl-5,5'-dimethylphenylmethane, tetrakis[methylene-3-(3,5-di-tert-butyl-4-hydroxyphenyl)propionate]methane, 1,1,3-tris(2-methyl-4-hydroxy-5-tert-butylphenyl)buthane, 1,3,5-trimethyl-2,4,6-tris(3,5-di-tert-butyl-4-hydroxybenzyl)benzene, stearyl-β-(3,5-di-tert-butyl-4-hydroxyphenyl)propionate, 2,2'-dioxy-3,3'-di-tert-butyl-5,5'-diethylphenylmethane, 3,9-bis[1,1-dimethyl-2-[β-(3-tert-butyl-4-hydroxy-5-methylphenyl)propionyloxy]ethyl], 2,4,8,10-tetraoxaspiro[5,5]undecane, tris(2,4-di-tert-butylphenyl)phosphite, cyclicneopentanetetrailbis(2,4-di-tert-butylphenyl)phosphite, cyclicneopentanetetrailbis(2,6-di-tert-butyl-4-methylphenyl)phosphite, and 2,2-methylenebis(4,6-di-tert-butylphenyl)octylphosphite; and UV absorbents such as 2,4-dihydroxybenzophenone, 2-hydroxy-4-methoxybenzophenone, and the like. In addition, for the purpose of improving processability, additives such as a lubricant and the like may be added thereto.

The amount of the antioxidants to be added is, for example, in the range of 0.1 to 3 parts by weight, preferably in the range of 0.2 to 2 parts by weight relative to 100 parts by weight of the saturated norbornene resin.

To the saturated norbornene resin, various additives such as phenolic or phosphoric antioxidants, antistatic agents, UV absorbents, lubricants may be added, if desired. In particular, since the liquid crystal is generally deteriorated by UV, it is preferred to add the UV absorbents to the resin in case of not using a protection means such as laminating UV protect filters on the liquid crystal. As for the UV absorbents, benzophenone-based UV absorbents, benzotriazole-based UV absorbents, acrylonitrile-based UV absorbents, or the like may be used. Among these, the benzophenone-based UV absorbents are preferable and the amount to be added is, for example, in the range of 10 to 100,000 ppm, preferably in the range of 100 to 10,000 ppm. In case of producing a sheet by a solution casting method, it is preferred to add a labeling agent in order to lower the surface roughness of the sheet. As for the labeling agents, for example, labeling agents for pigments such as fluorine-based nonionic surfactants, particular acrylic resin-based labeling agents, silicone-based labeling agents, and the like may be used. Among these, the agents which have excellent compatibility with solvent is preferable and the amount to be added is, for example, in the range of 5 to 50,000 ppm, preferably in the range of 10 to 20,000 ppm.

In the present invention, other cycloolefins which can be subjected to ring-opening polymerization can be used in combination without departing from the scope of the invention. Preferred examples of such cycloolefins include compounds having one reactive double bond, such as cyclopentene, cyclooctene, and 5,6-dihydrodicyclopentadiene.

Such saturated norbornene resins can be formed into film by either a solvent casting method or a melt casting method.

Various additives (for instance, retardation reducers, antioxidants, ultraviolet absorbers, releasing agents, plasticizers, and infrared absorbers) may be added to cyclic olefin resin depending on their applications, and these additives may be in the form of solid or oil.

The retardation film exhibits optical characteristics which contribute to view angle compensation for a liquid crystal cell. In an embodiment of a preferred TN mode liquid crystal display including retardation films disposed on the back light side and viewing side of a liquid crystal cell, a phase difference is preferably Re(550)=1 to 80 nm and Rth(550)=100 to 180 nm, and more preferably Re(550)=5 to 60 nm and Rth(550)=110 to 160 nm. In the present embodiment, although the primary component of the viewing-side retardation film may be cyclic olefin resin or any other material (for example, cellulose acylate) as in the back-light-side retardation film, retardation films having the same optical characteristics are preferably disposed both on the back light side and the viewing side of the liquid crystal cell.

Stretching

The retardation film is preferably a biaxially-stretched film subjected to biaxial stretching to adjust retardation to a predetermined range.

Biaxial stretching includes simultaneous biaxial stretching and sequential biaxial stretching, and sequential biaxial stretching is preferred in terms of continuous production. The sequential stretching involves casting a dope onto a film, separating the film from a band or a drum, and stretching the film in the TD and then the MD, or stretching the film in the MD and then the TD.

In order to reduce residual strain after the stretching for a reduction in dimensional change or for a decrease in a variation of an in-plane slow axis in the TD, a lateral stretching process is preferably followed by a relaxation process. After the relaxation process, the film has a width preferably adjusted to 100% to 70% of the width of the film before the relaxation process (relaxation ratio of 0% to 30%). The temperature in the relaxing process preferably ranges from the apparent glass transition temperature (Tg) of a film minus 50° C. to Tg plus 50° C. In normal stretching, the time required for the film stretched to the maximum width in a tenter zone to pass through a relaxation zone is shorter than one minute.

The apparent Tg of the film in the stretching process is obtained from an endothermic curve with a differential scanning calorimeter (DSC) determined by encapsulating a film containing a residual solvent into an aluminum pan and increasing the temperature from 25° C. to 200° C. at a rate of 20° C./min.

In the case where the stretching is carried out during the film formation process, the film can be dried while being transported. The drying temperature is preferably in the range of 100° C. to 200° C., more preferably 100° C. to 150° C., further preferably 110° C. to 140° C., and still further preferably 130° C. to 140° C. Although the drying time is not specifically limited, preferred is 10 to 40 minutes.

Selecting an optimum drying temperature after the stretching can reduce residual stress in the resulting film, which can reduce a dimensional change, changes in optical characteristics, and a change of the slow axis direction, under high-temperature and high-humidity environments.

In the case of stretching a non-stretched film which has been wound up after film formation, the stretched film may be optionally subjected to heat treatment. The heat treatment can preferably reduce the residual stress in the resulting retardation film, which can reduce a dimensional change, changes in optical characteristics, and a change of the slow axis direction, under high-temperature and high-humidity environments. The heating temperature is not specifically limited and preferably ranges from 100° C. to 200° C.

2. Protective Film

In the present invention, a protective film is provided on the back-light-side surface of the back-light-side polarizing film and has a thickness of 10 to 60 µm and a tensile modulus of 3.0 to 8.0 GPa.

Although the protective film attached to the other surface of the polarizing film (the outer surface of the polarizing film incorporated in the liquid crystal display) is not specifically limited, the film preferably has a high elastic modulus and therefore reduces the contraction of the polarizing film. Examples of materials used for the protective film include various polymers such as cellulose acylate; polycarbonate polymers; polyester polymers e.g., polyethylene terephthalate and polyethylene naphthalate; acrylic polymers e.g., polymethyl methacrylate; and styrene polymers e.g., polystyrene and acrylonitrile-styrene copolymers (AS resins). The primary component for preparation of the polymer film which functions as the protective film can be at least one polymer selected from polyolefin polymers, for example, polyolefins such as polyethylene and polypropylene, cyclopolyolefins such as norbornene, and ethylene-propylene copolymers; vinyl chloride polymers; amide polymers such as nylon and aromatic polyamides; imide polymers; sulfone polymers; polyether sulfone polymers; polyether ether ketone polymers; polyphenylen sulfide polymers; vinylidene chloride polymers; vinyl alcohol polymers; vinyl butyral polymers; acrylate polymers; polyoxymethylene polymers; epoxy polymers; and polymers containing a mixture of these polymers. Among films of these polymers, preferred are cellulose acylate films, and more preferred is a cellulose triacetate film.

Tensile Modulus

The protective film used in the present invention preferably has a tensile modulus of 3.0 to 8.0 GPa in the direction parallel to the absorption axis, preferably 4.0 to 7.0 GPa, and more preferably 5.0 to 7.0 GPa in view of a reduction in the contraction of the protective film in the absorption axis direction in which the polarizing film exhibits small contraction. In particular, a preferred tensile modulus in the direction parallel to the absorption axis of the protective film is 5.0 GPa or higher, which can further reduce the dimensional change rate δMD and effectively reduce thermal unevenness.

In the case where the absorption axis of the polarizing film is parallel to the ordinary transport direction of the protective film, the tensile modulus is a value measured in the transport direction (MD) of the protective film.

In order to adjust the tensile modulus of the protective film in the MD within a preferred range, the protective film may be uniaxially stretched in the MD. The tensile modulus of an unstretched film which is produced by a solvent casting method can also be adjusted within the preferred range through selection of appropriate cellulose acylate as the primary component or proper selection of the types or amounts of the additives in some cases.

In the present invention, another protective film may be provided on the viewing-side surface of the viewing-side polarizing film. Examples of such a protective film include the polymer films described above and multilayered films at least including a hardcoat layer and a low-refractive-index layer formed thereon. Such multilayered protective films preferably include a low-refractive-index layer formed as the topmost layer on the viewing side. The hardcoat layer and the low-refractive-index layer may be each a laminate of two or more sublayers.

JP-A2007-041495 and JP-A2007-254699 disclose the details of the laminated hardcoat layer and low-refractive-index layer in paragraphs [0015] to [0113] and paragraphs [0182] to [0220], respectively, and also disclose preferred characteristics and materials thereof.

In addition to the hardcoat layer and the low-refractive-index layer, for instance, other layers may be provided, such as a high-refractive-index layer and a medium-refractive-index layer (the refractive index is higher than that of a low-refractive-index layer and lower than that of a high-refractive-index layer).

For example, a medium-refractive-index layer, a high-refractive-index layer, and a low-refractive-index layer are formed on a hardcoat layer in sequence from the lower side (side of a liquid crystal cell) as disclosed in JP-A8-122504, JP-A8-110401, JP-A10-300902, JP-A2002-243906, and JP-A2000-111706. JP-A2008-262187 discloses a three-layered antireflection film which exhibits good robustness against a film thickness variation. The three-layered antireflection film disposed on a surface of an image displaying device can give an average reflection index of 0.5% or lower and can drastically reduce background reflection, which can produce highly stereoscopic images. Furthermore, different functions may be imparted to the individual layers, and examples of such layers include an antifouling low-refractive-index layer, an antistatic high-refractive-index layer, an antistatic hardcoat layer, and an anti-glare hardcoat layer (as disclosed in, for instance, JP-A10-206603, JP-A 2002-243906, and JP-A 2007-264113).

Polarizing Film

The polarizing film used in the present invention may be composed of any material without limitation. For instance, a usable material is formed by stretching a polyvinyl alcohol film in an iodine solution. Examples of adhesive agents used for integration of the retardation film with the polarizing film include aqueous solution of polyvinyl alcohol or polyvinyl acetal (e.g., polyvinyl butyral) and latex of vinyl polymers (e.g., polybutyl acrylate). An especially preferred adhesive agent is an aqueous solution of completely saponified polyvinyl alcohol.

The polarizing film has a thickness of preferably 10 to 50%, more preferably 20 to 45%, and further preferably 25 to 40% of that of the protective film, which can reduce the contraction of the polarizing plate. In particular, a preferred thickness is in the range of 1.0 to 30 µm, more preferred is 2 to 27 µm, and further preferred is 2.5 to 24 µm.

3. Polarizing Plate

The retardation film and the protective film are integrated with the polarizing film into a laminated polarizing plate, and the polarizing plate can be then attached to a liquid crystal cell. The relationship between a transmission axis of the polarizing film and an in-plane slow axis of the retardation film is not specifically limited. A polarizing plate formed such that the transmission axis of the polarizing film is in parallel with the in-plane slow axis of the retardation film may be used, and a polarizing plate formed such that the transmission axis of the polarizing film orthogonally intersects the in-plane slow axis of the retardation film may be used.

Method for Producing Polarizing Plate

An example method for producing the polarizing plate involves laminating a long polarizing film, retardation film, and protective film in their longitudinal directions to form a laminate and cutting the laminate in a rectangle having four sides biased by 45° from the longitudinal direction. Since a long polarizing film normally has an absorption axis along its longitudinal direction, the 45° bias cutting of the laminate from the longitudinal direction can readily produce polarizing plates each having long or short sides biased by 45° from the absorption axis of the polarizing film. Since a long film generally has an in-plane slow axis in the direction parallel or orthogonal to the longitudinal direction thereof, the retardation film also has an in-plane slow axis in the direction at 45° from the long or short sides of the polarizing plate.

Dimensional Change Rate of Polarizing Plate

In the present invention, in order to reduce the dimensional change of the polarizing plate only in the absorption axis direction in which the polarizing film exhibits small contraction, the dimensional change rate δMD of the polarizing plate in the absorption axis of the polarizing film and the dimensional change rate δTD of the polarizing plate in a direction orthogonal to the absorption axis of the polarizing film satisfy the formula:

$$M=|\delta TD/\delta MD|\geq 2.0.$$

Preferably M is 2.5 or higher, and more preferably 4.0 or higher.

In the formula, M represents the ratio of the dimensional change rates in the entire polarizing plate, δMD (%) represents a percent change in the length of the polarizing plate after being dried at 60° C. for 100 hours to the initial length of the polarizing plate in the absorption axis direction at 25° C. and a 60% RH, and δTD (%) represents a percent change in the length of the polarizing plate after being dried at 60° C. for 100 hours to the initial length of the polarizing plate in the direction orthogonal to the absorption axis at 25° C. and 60% RH.

Specifically, from the length $L1_{pol}$ of the initial polarizing plate in the absorption axis direction at 25° C. and 60% RH and the length $L2_{pol}$ of the polarizing plate dried at 60° C. for 100 hours in the absorption axis direction at 25° C. and 60% RH, the δMD value can be determined using the following formula:

$$\delta MD=\{(L2_{pol}-L1_{pol})/L1_{pol}\}\times 100$$

Furthermore, from the length $L3_{pol}$ of the initial polarizing plate in the direction orthogonal to the absorption axis direction at 25° C. and 60% RH and the length $L4_{pol}$ of the polarizing plate dried at 60° C. for 100 hours in the direction orthogonal to the absorption axis direction at 25° C. and 60% RH, the δTD value can be determined using the following formula:

$$\delta TD=\{(L4_{pol}-L3_{pol})/L3_{pol}\}\times 100$$

The dimensional change of the polarizing plate in the transmission direction (direction orthogonal to the absorption axis) in which the polarizing film exhibits large contraction can be determined as in the determination of the δMD value except for changing the direction in the dimensional measurement.

In the measurement of a dimensional change rate, δMD may be a negative value, and its absolute value is preferably 0.2% or lower, which can increase an anisotropic dimensional change in the polarizing plate and reduce thermal unevenness. A more preferred δMD value is 0.1% or lower.

The absolute value of δTD is preferably 0.4% or higher, and more preferably 0.4 to 1.0%, which can increase an anisotropic dimensional change in the polarizing plate and reduce thermal unevenness.

The term "dimension of the polarizing plate in the absorption axis direction" herein refers to the length of an entire laminate in the absorption axis direction, the laminate including the polarizing film, the protective film formed on one side of the polarizing film, and the retardation film formed on the other side of the polarizing film.

4. Back Light

The back light used in the present invention includes a light source disposed at an edge or a corner of the liquid crystal display.

Any light source can be used in the back light, and such light source may be a light bulb, a light emitting diode, an electroluminescent panel (ELP), or one or more cold cathode fluorescent lamps (CCFLs) or hot cathode fluorescent lamps (HCFLs). In addition, components to enhance utilization efficiency of light can be used for the back light, such as reflectors and brightness enhancing films (brightness-improving films). In addition to these components, for example, one or more layers of a prism sheet, a lens array sheet, and a light diffusion plate can be disposed to form a light crystal display.

5. Liquid Crystal Display

The liquid crystal display of the present invention is preferably of a TN mode. A TN-mode liquid crystal cell is not specifically limited, and any TN-mode liquid crystal cell can be used. The liquid crystal display of the present invention is suitable for use in apparatuses for personal use with a display size of 3 to 17 inches, such as laptops, tablet computes, and smartphones. The mainstream of the laptops is thin type products, and the Δnd value of a thin TN-mode liquid crystal cell is generally in the range of 350 to 450 nm.

EXAMPLES

The characteristics of the invention are described more concretely with reference to Production Examples and Examples given below. In the following Examples, the material used, its amount and the ratio, the details of the treatment and the treatment process may be suitably modified or changed not overstepping the scope of the invention. Accordingly, the invention should not be limitatively interpreted by the Examples mentioned below.

Example I

1. Production of Retardation Film

Production of Retardation Film A (1) Synthesis of Saturated Norbornene Resin-A

A solution of triethylaluminum in 15% cyclohexane (10 parts by weight), triethylamine (5 parts by weight), and a solution of titanium tetrachloride in 20% cyclohexane (10 parts by weight) were added as polymerization catalysts to 6-methyl-1,4,5,8-dimethano-1,4,4a,5,6,7,8,8a-octahydronaphthalene for ring-opening polymerization in cyclohexane, and a resulting ring-opened polymer was hydrogenated with a nickel catalyst to yield a polymer solution. The polymer solution was coagulated in isopropyl alcohol and then dried to yield a powder resin. The resin has a number average molecular weight of 40,000, a hydrogenation ratio of 99.8% or higher, and Tg of 139° C.

(2) Melt Casting

The saturated norbornene resin-A was formed into columnar pellets having a diameter of 3 mm and a length of 5 mm. The pellets were dried at 110° C. in a vacuum drier to reduce the moisture content of the pellets to 0.1% or lower, and the resulting product was then put into a hopper kept at 129° C.

The pellets were melt in a single-screw kneader at a melting temperature to cause a melt viscosity of 5000 Pa·s for five minutes, and the melt was casted from a T-die at a temperature 10° C. higher than the melting temperature onto a casting drum kept at 134° C. to form a solid film. In this process, the melt was casted to form the solid film by use of electrostatic charge method (a wire of 10 kV was positioned 10 cm apart from the point of the casting drum where melt was landed). The solidified film was separated from the casting drum and then wound up. Both ends (3% of the total width for each) of the separated product were trimmed off immediately before being wound up to form knurlings with a width of 10 mm and a height of 50 μm at the two ends. The solidified film with a width of 1.5 m was wound up at a rate of 30 m/min into a length of 3000 m.

(3) Stretching

The saturated norbornene film produced through the melt casting process was longitudinally stretched to 2.4 times in the MD under the following conditions. The film was longitudinally stretched by changing the transport rate of nip rolls disposed outside a stretching zone, where the value (L/W) determined by dividing the distance between the nip rolls used for stretching (L: distance between cores of two pairs of nip rolls) by the width (W) of the unstretched saturated norbornene film was set to 4.0.

The film was further stretched to 1.8 times in the TD with a tenter. The stretching was carried out at 149° C. The temperature of the nip rolls disposed outside the stretching zone was 60° C. while the temperature of the stretching zone was 149° C. A retardation film A was produced in this manner. The retardation film A had a thickness of 25 μm.

Production of Retardation Film B

A retardation film B was produced as in the production of the retardation film A except that a film was stretched to 1.6 times in the MD and then stretched to 1.2 times in the TD with a tenter. The retardation film B had a thickness of 40 μm.

2. Production of Protective Film

Production of Protective Film A

The following composition was put into a mixing tank and stirred for dissolution of components while being heated to prepare a dope.

Composition of Dope

| | |
|---|---|
| Cellulose triacetate (substitution degree: 2.85 and Mn = 66,000) | 100 parts by mass |
| Triphenyl phosphate | 6.8 parts by mass |
| Biphenyl diphenyl phosphate | 4.9 parts by mass |
| TINUVIN 326 (manufactured by BASF Japan Ltd.) | 0.24 parts by mass |
| TINUVIN 328 (manufactured by BASF Japan Ltd.) | 0.98 parts by mass |
| Particulate silica (average particle diameter: 16 nm, aerosil R972 manufactured by Nippon Aerosil Co., Ltd.) | 0.14 parts by mass |
| Methylene chloride | 414.8 parts by mass |
| Methanol | 62.0 parts by mass |

The prepared dope was uniformly cast from a casting die onto a stainless-steel endless band (casting support) of a band casting apparatus.

After the residual solvent in the dope reached 40 mass %, the dope in the form of a polymer film was separated from the casting support, the film was dried in a drying zone at 110° C., and the edges of the film were cut into a film having a width of 2000 mm. The residual solvent was less than 0.1 mass %. The film had an MD elastic modulus of 4.4 GPa.

Production of Protective Film B

A polymethyl methacrylate (PMMA) resin (DELPET 80N manufactured by Asahi Kasei Corp.) was dried in a vacuum drier at 90° C. to reduce the moisture content of the resin to 0.03% or lower, and then a stabilizer (IRGANOX 1010 manufactured by BASF Japan Ltd., 0.3 weight %) was added to the dried resin. The mixture was then extruded from a double-screw vent extruder at 230° C. under nitrogen into water to form a strand which was then cut into pellets having a diameter of 3 mm and a length of 5 mm.

The pellets were dried at 90° C. in a vacuum drier to reduce the moisture content of the pellets to 0.03% or lower, and the dried pellets were kneaded with a single-screw extruder under conditions of 210° C. at a feed section, 230° C. at a compression section, and 230° C. at a weighing section, and then the melt was ejected. In this process, a 300-mesh screen filter, a gear pump, and a leaf disk filter with a filtration accuracy of 7 μm were disposed in sequence between the extruder and the die, each being connected with melt pipes. A static mixer was also provided to the interior of the melt pipe in front of the die.

The melt (melted resin) was then extruded onto triple cast rolls. In this process, the most upstream cast roll was brought into contact with a touch roll. The touch roll used is disclosed in Example 1 in JP-A11-235747 (component mentioned as a double holding roll, but a thin metallic outer cylinder was modified to a thickness of 2 mm).

The product was trimmed at its ends (5 cm for each of the wide) immediately before being wound up, and knurlings with a width of 10 mm and a height of 20 μm were formed at the two ends of the product. The film was then wound up at a rate of 30 m/min into a length of 3000 m.

Stretching

The resulting acrylic film was biaxially stretched in the MD and TD at an MD stretching ratio of 1.5, an MD stretching temperature of Tg, an MD stretching rate of 10%/sec, a TD stretching ratio of 2.0, a TD stretching temperature of Tg, a TD stretching rate of 10%/sec, an L/W ratio of 5, and a temperature for clipping of Tg minus 5° C. The stretched acrylic film was used as a protective film B.

Production of Protective Film C

The protective film A was stretched by 45% at 185° C. in the MD to produce a film having an MD elastic modulus of 5.3 GPa. The film was used as a protective film C.

Production of Protective Film D

A triacetate cellulose film (FUJITAC TD80, manufactured by FUJIFILM Corporation) with a thickness of 80 μm was used as a protective film D.

3. Production of Polarizing Film

Production of Polarizing Film A

Polyvinyl alcohol (PVA) powder (mean degree of polymerization: 2400 and degree of saponification: 99.9% or higher) was dissolved in purified water into a concentration of 10 mass % to prepare an aqueous solution, and the aqueous solution was applied onto a polyester film and then dried at 40° C. for 3 hours. The product was further dried at 110° C. for 60 minutes to produce a PVA film having a thickness of 50 μm. The PVA film was swelled in hot water at 30° C. for 1 minute, then was immersed into an aqueous solution containing potassium iodide, iodine, C.I. Direct Yellow 44 (λmax=420 nm), and salt cake (proportion by weight of 10:1: 0.2:2) at 30° C., and then uniaxially stretched to 1.5 times in a longitudinal direction. An aqueous solution of potassium iodide and iodine (weight ratio of 10:1) had an iodine concentration of 0.38 mass %. The film was further uniaxially stretched in a longitudinal direction in an aqueous 4.25% boric acid solution at 50° C. to a total stretching ratio of 7, and the film was washed with water in a water bath at 30° C. and then dried at 50° C. for 4 minutes to yield a polarizing film A with a thickness of 12.5 μm. The transmittance of the polarizing film A alone was 43.5% or higher, and the polarizing film A had a polarization degree of 99.6% or higher.

Production of Polarizing Film B

PVA powder (mean degree of polymerization: 2400 and degree of saponification: 99.9% or higher) was dissolved in purified water into a concentration of 10 mass % to prepare an aqueous solution, and the aqueous solution was applied onto a polyester film and then dried at 40° C. for 3 hours. The product was further dried at 110° C. for 60 minutes to produce a PVA film having a thickness of 80 μm. The PVA film was swelled in hot water at 30° C. for 1 minute, then was immersed into an aqueous solution containing potassium iodide, iodine, C.I. Direct Yellow 44 (λmax=420 nm), and salt cake (proportion by weight of 10:1:0.2:2) at 30° C., and then uniaxially stretched to 1.5 times in a longitudinal direction. An aqueous solution of potassium iodide and iodine (weight ratio of 10:1) had an iodine concentration of 0.38 mass %. The film was further uniaxially stretched in a longitudinal direction in an aqueous 4.25% boric acid solution at 50° C. to a total stretching ratio of 6, and the film was washed with water in a water bath at 30° C. and then dried at 50° C. for 4 minutes to yield a polarizing film B with a thickness of 24 μm. The transmittance of the polarizing film B alone was 43.5% or higher, and the polarizing film B had a polarization degree of 99.6% or higher.

4. Production of Polarizing Plate

Production of Polarizing Plate 1

The protective film A and the retardation film A which had been each saponified with an aqueous sodium hydroxide solution were attached to two sides, respectively, of the polarizing film A with a commercially available PVA adhesive agent so as to align their longitudinal directions, thereby giving a rolled polarizing plate 1.

Production of Polarizing Plate 2

The protective film B and the retardation film A which had been each saponified with an aqueous sodium hydroxide solution were attached to two sides, respectively, of the polarizing film A with a commercially available PVA adhesive agent so as to align their longitudinal directions, thereby giving a rolled polarizing plate 2.

Production of Polarizing Plate 3

The protective film A and the retardation film A which had been each saponified with an aqueous sodium hydroxide solution were attached to two sides, respectively, of the polarizing film B with a commercially available PVA adhesive agent so as to align their longitudinal directions, thereby giving a rolled polarizing plate 3.

Production of Polarizing Plate 4

The protective film C and the retardation film A which had been each saponified with an aqueous sodium hydroxide solution were attached to two sides, respectively, of the polarizing film A with a commercially available PVA adhesive agent so as to align their longitudinal directions, thereby giving a rolled polarizing plate 4.

Production of Polarizing Plate 5

The protective film A and the retardation film B which had been each saponified with an aqueous sodium hydroxide solution were attached to two sides, respectively, of the polarizing film A with a commercially available PVA adhesive agent so as to align their longitudinal directions, thereby giving a rolled polarizing plate 5.

Production of Polarizing Plate 6

The protective film D and the retardation film A which had been each saponified with an aqueous sodium hydroxide solution were attached to two sides, respectively, of the polarizing film A with a commercially available PVA adhesive agent so as to align their longitudinal directions, thereby giving a rolled polarizing plate 6.

Example 1

Production of TN-Mode Liquid Crystal Display

In a commercially available laptop including a TN-mode liquid crystal cell, a pair of polarizing plates (upper and lower polarizing plates) were removed from a liquid crystal display with a size of 15 inches. Instead, a polarizing plate 1 was attached to the viewing side of the liquid crystal cell with an adhesive agent interposed therebetween such that the retardation film faced the liquid crystal cell, and another polarizing plate 1 was attached to the back light side of the liquid crystal cell with an adhesive agent interposed therebetween such that the retardation film faced the liquid crystal cell, thereby producing a liquid crystal display 1. The polarizing plates were disposed such that the transmission axis of a viewing-side polarizing plate (polarizing plate on the front side) orthogonally intersected the transmission axis of the back-light-side polarizing plate. A back light included a white LED as a light source disposed at the edge of the lower long side on the back face of the liquid crystal display, a light guide panel, and a brightness-enhancing film for liquid crystal (BEF II manufactured by Sumitomo 3M Limited) disposed between the light guide panel and the back-light-side polarizing plate.

Example 2

Production of TN-Mode Liquid Crystal Display

A TN-mode liquid crystal display 2 was prepared as in Example 1 except that the polarizing plates 2 were used in place of the polarizing plates 1.

Example 3

Production of TN-Mode Liquid Crystal Display

A TN-mode liquid crystal display 3 was prepared as in Example 1 except that the polarizing plates 4 were used in place of the polarizing plates 1.

Example 4

Production of TN-Mode Liquid Crystal Display

A TN-mode liquid crystal display 4 was prepared as in Example 1 except that the polarizing plates 5 were used in place of the polarizing plates 1.

Comparative Example 1

Production of TN-Mode Liquid Crystal Display

A TN-mode liquid crystal display 5 was prepared as in Example 1 except that the polarizing plates 3 were used in place of the polarizing plates 1.

Comparative Example 2

Production of TN-Mode Liquid Crystal Display

A TN-mode liquid crystal display 6 was prepared as in Example 1 except that the polarizing plates 6 were used in place of the polarizing plates 1.

5. Evaluation (1) Measurement of Dimensional Change

Since the absorption axis of the polarizing plate was parallel to the MD, the dimensional change rate δMD of the entire polarizing plate in the MD was determined. More specifically, the dimensional change rate δMD was determined as follows:

A rectangular sample of 30 mm by 120 mm cut in the MD was left to stand at 25° C. and 60% RH for 2 weeks, holes having a diameter of 6 mm were formed at both ends of the sample at an interval of 100 mm, and the original length (L1) of the interval was measured with an automatic pin gauge set (manufactured by Shinto Scientific Co., Ltd.) at a minimum scale of 1/1000 mm. The sample was then dried at 60° C. for 100 hours, and the length (L2) of the interval between the holes were measured at 25° C. and 60% RH. The dimensional change rate was determined from the expression {(L2−L1)/L1}×100.

The dimensional change rate δTD of the entire polarizing plate in the TD orthogonal to the absorption axis was similarly determined.

(2) Measurement of Tensile Modulus

Since the absorption axis of the polarizing plate was parallel to the MD, the protective film was subjected to the following measurement in the MD to determine the tensile modulus of the protective film A rectangular sample of 10 mm by 138 mm was subjected to tensile measurement using a Compact Table-Top Universal Tester EZ Test/CE (manufactured by SHIMADZU CORPORATION) at 25° C. and 60% RH.

(3) Thermal Unevenness

The TN-mode liquid crystal display of Example 1 was left to stand in an "off" state for 18 hours at 40° C. and 80% RH and was then left to stand in an "on" state for 6 hours at 25° C. and 50% RH. This process was a cycle corresponding to one day and was repeated for three days. After leaving the TN-mode liquid crystal display to stand for six hours in the "on" state in the fourth cycle, the brightness of the liquid crystal display lightning in a black display mode was measured and evaluated on the basis of the following criteria. The TN-mode liquid crystal displays 2 to 6 were also similarly evaluated.

Excellent: entirely uniform brightness and invisible brightness unevenness;

Good: slightly increased but negligible brightness at the periphery of the casing of the display;

Acceptable: increased but acceptable brightness at the periphery of the casing of the display; and Rejected: high brightness in substantially the half of a screen, and unacceptable brightness unevenness.

TABLE 1

| | | | Example 1 | Example 2 | Example 3 | Example 4 | Comparative Example 1 | Comparative Example 2 |
|---|---|---|---|---|---|---|---|---|
| Liquid crystal cell | | Mode | TN | TN | TN | TN | TN | TN |
| Back-light-side polarizing plate | Retardation film | Retardation film No. | A | A | A | B | A | A |
| | | Thickness (μm) | 25 | 25 | 25 | 40 | 25 | 25 |
| | | Retardation film thickness/ Protective film thickness | 63% | 63% | 63% | 100% | 63% | 31% |
| | Polarizing film | Polarizing film No. | A | A | A | A | B | A |
| | | Thickness (μm) | 12.5 | 12.5 | 12.5 | 12.5 | 24 | 12.5 |
| | | Polarizing film thickness/ Protective film thickness | 31% | 28% | 31% | 31% | 60% | 16% |
| | Protective film | Protective Film No. | A | B | C | A | A | D |
| | | Elastic modulus (GPa) | 4.4 | 3.2 | 5.3 | 4.4 | 4.4 | 3.9 |
| | | Thickness (μm) | 40 | 44 | 40 | 40 | 40 | 80 |
| Evaluation | | Dimensional change δMD (%) | −0.2 | −0.2 | −0.1 | −0.2 | −0.4 | −0.2 |
| | | Dimensional change δTD (%) | −0.6 | −0.5 | −0.5 | −0.6 | −0.6 | −0.3 |
| | | |δTD/δMD| | 3 | 2.5 | 5 | 3 | 1.5 | 1.5 |
| | | Thermal unevenness | Good | Good | Excellent | Acceptable | Rejected | Rejected |

Table 1 demonstrates that Examples 1 to 4 including the retardation films, the back-light-side polarizing films, and the protective films satisfying predetermined requirements exhibit satisfactory results on thermal unevenness. Thus, the liquid crystal displays of Examples 1 to 4 are suitable as thin liquid crystal displays each provided with a back light including a light source disposed at an edge or a corner of the liquid crystal display, in particular, suitable for laptops.

In contrast, Comparative Examples 1 and 2 exhibit unsatisfactory results on the thermal unevenness as compared to Examples 1 to 4. The results shown in the table show that Comparative Example 1 including a polarizing film having a thickness outside of the present invention exhibits an M value representing anisotropy of a dimensional change not satisfying the requirement of the present invention, regardless of the use of the retardation film and the protective film used in Example 1; and Comparative Example 2 including a protective film having a thickness outside of the present invention also exhibits the anisotropy regardless of the use of the retardation film and the protective film used in Examples 1 to 3, resulting in an insufficient reduction in thermal unevenness as compared to Examples.

Example II

Production of Protective Film E

The same dope as used for the production of the protective film A was used, and the dope was subjected to band casting with the only change in a film thickness and was then dried.

Production of Protective Film F

The same dope as used for the production of the protective film A was used, and the dope was subjected to band casting with a change in a film thickness. The resulting film was stretched by 35% in the MD under the conditions of a residual solvent content of 10 to 20 mass % and a temperature of 130° C. to 140° C. and was then dried.

Production of Protective Film G

The same dope as used for the production of the protective film A was used, and the dope was subjected to band casting with a change in a film thickness. The film was stretched by 25% in the MD under the conditions of a residual solvent content of 10 to 20 mass % and a temperature of 130° C. to 140° C. and was then dried.

Polarizing plates were produced as in Example 1, except that different protective films were used, and tensile moduli of the protective films, dimensional changes of the polarizing plates, and the thermal unevenness were evaluated as in Example I. The results are shown in Table 2.

TABLE 2

| | | | Comparative Example 3 | Example 5 | Example 6 |
|---|---|---|---|---|---|
| Liquid crystal cell | | Mode | TN | TN | TN |
| Back-light-side polarizing plate | Retardation film | Retardation film No. | A | A | A |
| | | Thickness (μm) | 25 | 25 | 25 |
| | | Retardation film thickness/Protective film thickness | 93% | 93% | 71% |
| | Polarizing film | Polarizing film No. | A | A | A |
| | | Thickness (μm) | 12.5 | 12.5 | 12.5 |
| | | Polarizing film thickness/Protective film thickness | 46% | 46% | 36% |
| | Protective film | Protective Film No. | E | F | G |
| | | Elastic modulus (GPa) | 4.3 | 6.3 | 5.8 |
| | | Thickness (μm) | 27 | 27 | 35 |
| Evaluation | | Dimensional change δMD (%) | −0.4 | −0.3 | −0.2 |
| | | Dimensional change δTD (%) | −0.7 | −0.7 | −0.7 |
| | | |δTD/δMD| | 1.8 | 2.3 | 3.5 |
| | | Thermal unevenness | Rejected | Good | Excellent |

The present disclosure relates to the subject matter contained in Japanese Patent Application No. 181309/2011 filed on Aug. 23, 2011, and Japanese Patent Application No. 090032/2012 filed on Apr. 11, 2012, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display comprising: a liquid crystal cell; a back light including a light source disposed at any one of an edge and a corner in the rear of the liquid crystal cell; and a laminated polarizing plate including a protective film, a polarizing film, and a retardation film in sequence from the side of the back light, wherein the angle defined by any one of the long and short sides of the polarizing plate and the absorption axis of the polarization film is 45°, the retardation film has an in-plane slow axis parallel or orthogonal to the absorption axis of the polarizing film, the protective film has a thickness of 10 to 60 μm and a tensile modulus of 3.0 to 8.0 GPa in a direction parallel to the absorption axis of the polarizing film, the polarizing film has a thickness being 10 to 50% of the thickness of the protective film, the retardation film comprises a cyclic olefin resin and has a thickness being 30 to 100% of the thickness of the protective film, and a dimensional change rate δMD of the polarizing plate in the absorption axis direction of the polarizing film and a dimensional change rate δTD of the polarizing plate in a direction orthogonal to the absorption axis of the polarizing film satisfy the formula:

$$M=|\delta TD/\delta MD|\geq 2.0,$$

where M represents the ratio of the dimensional change rates in the entire polarizing plate, δMD (%) represents a percent change in the length of the polarizing plate after being dried at 60° C. for 100 hours to the initial length of the polarizing plate in the absorption axis direction at 25° C. and a 60% RH, and δTD (%) represents a percent change in the length of the polarizing plate after being dried at 60° C. for 100 hours to the initial length of the polarizing plate in the direction orthogonal to the absorption axis at 25° C. and 60% RH.

2. The liquid crystal display according to claim 1, wherein the retardation film is an optically biaxial retardation film.

3. The liquid crystal display according to claim 1, wherein the product of a thickness (unit: μm) and a tensile modulus (unit: GPa) of the protective film is not less than 140.

4. The liquid crystal display according to claim 1, further comprising:
    a viewing-side polarizing film provided at the viewing side of the liquid crystal cell,
    wherein the retardation film is provided between the liquid crystal cell and the viewing-side polarizing film; and the protective film is provided on the viewing-side surface of the viewing-side polarizing film.

5. The liquid crystal display according to claim 1,
    wherein the retardation film is an optically biaxial retardation film, and the product of a thickness (unit: μm) and a tensile modulus (unit: GPa) of the protective film is not less than 140.

6. The liquid crystal display according to claim 1,
    which further comprises a viewing-side polarizing film provided at the viewing side of the liquid crystal cell; and
    wherein the retardation film is an optically biaxial retardation film, the retardation film is provided between the liquid crystal cell and the viewing-side polarizing film, and the protective film is provided on the viewing-side surface of the viewing-side polarizing film.

7. The liquid crystal display according to claim 1,
    which further comprises a viewing-side polarizing film provided at the viewing side of the liquid crystal cell; and
    wherein the retardation film is an optically biaxial retardation film, the product of a thickness (unit: μm) and a tensile modulus (unit: GPa) of the protective film is not less than 140, the retardation film is provided between the liquid crystal cell and the viewing-side polarizing film, and the protective film is provided on the viewing-side surface of the viewing-side polarizing film.

8. The liquid crystal display according to claim 1, further comprising:
    any one of a brightness-enhancing film and a prism sheet provided at the back light side of the protective film.

9. The liquid crystal display according to claim 1, wherein the liquid crystal cell is a TN-mode liquid crystal cell.

10. The liquid crystal display according to claim 1, wherein the liquid crystal cell has a size ranging from 3 to 24 inches.

11. The liquid crystal display according to claim 1, wherein the liquid crystal display is a display of a laptop.

12. The liquid crystal display according to claim 2, further comprising:
    any one of a brightness-enhancing film and a prism sheet provided at the back light side of the protective film.

13. The liquid crystal display according to claim 2,
    wherein the liquid crystal cell is a TN-mode liquid crystal cell.

14. The liquid crystal display according to claim 2, wherein the liquid crystal cell has a size ranging from 3 to 24 inches.

15. The liquid crystal display according to claim 2, wherein the liquid crystal display is a display of a laptop.

16. The liquid crystal display according to claim 3, further comprising:
    any one of a brightness-enhancing film and a prism sheet provided at the back light side of the protective film.

17. The liquid crystal display according to claim 3, wherein the liquid crystal cell is a TN-mode liquid crystal cell.

18. The liquid crystal display according to claim 3,
    wherein the liquid crystal cell has a size ranging from 3 to 24 inches.

19. The liquid crystal display according to claim 3, wherein the liquid crystal display is a display of a laptop.

20. The liquid crystal display according to claim 4, further comprising:
    any one of a brightness-enhancing film and a prism sheet provided at the back light side of the protective film.

\* \* \* \* \*